United States Patent
Chen

(10) Patent No.: US 7,876,195 B2
(45) Date of Patent: Jan. 25, 2011

(54) FAN RESISTOR

(76) Inventor: Jack Chen, 300 Windsor Dr., Oak Brook, IL (US) 60523

(*) Notice: Subject to any disclaimer, the term of this patent is extended or adjusted under 35 U.S.C. 154(b) by 392 days.

(21) Appl. No.: 12/056,429

(22) Filed: Mar. 27, 2008

(65) Prior Publication Data

US 2009/0243788 A1    Oct. 1, 2009

(51) Int. Cl.
*H01C 3/10* (2006.01)
*H01C 7/22* (2006.01)

(52) U.S. Cl. .................................. 338/287; 338/280

(58) Field of Classification Search ............. 338/287, 338/280, 283

See application file for complete search history.

(56) References Cited

U.S. PATENT DOCUMENTS

| | | | |
|---|---|---|---|
| 4,659,906 A * | 4/1987 | Furtek | 392/435 |
| 6,483,087 B2 * | 11/2002 | Gardner et al. | 219/545 |
| 6,747,543 B2 * | 6/2004 | Lim | 338/50 |
| 2003/0111454 A1 * | 6/2003 | Ishiyama et al. | 219/217 |
| 2003/0201870 A1 * | 10/2003 | Ikemoto et al. | 338/206 |

* cited by examiner

*Primary Examiner*—Kyung Lee
(74) *Attorney, Agent, or Firm*—Robert L. Marsh

(57) ABSTRACT

A fan resistor is formed with a resistive pattern of electrically conductive material sandwiched between two panels of thermally conductive material. An insulating barrier on each surface of the resistive pattern electrically insulates it from the thermally conductive panels. The resistive pattern is cut from a sheet of metal using a stamping machine and the cut resistive pattern is dropped on one of the panels, a surface of which has an electrically insulating barrier thereon.

9 Claims, 6 Drawing Sheets

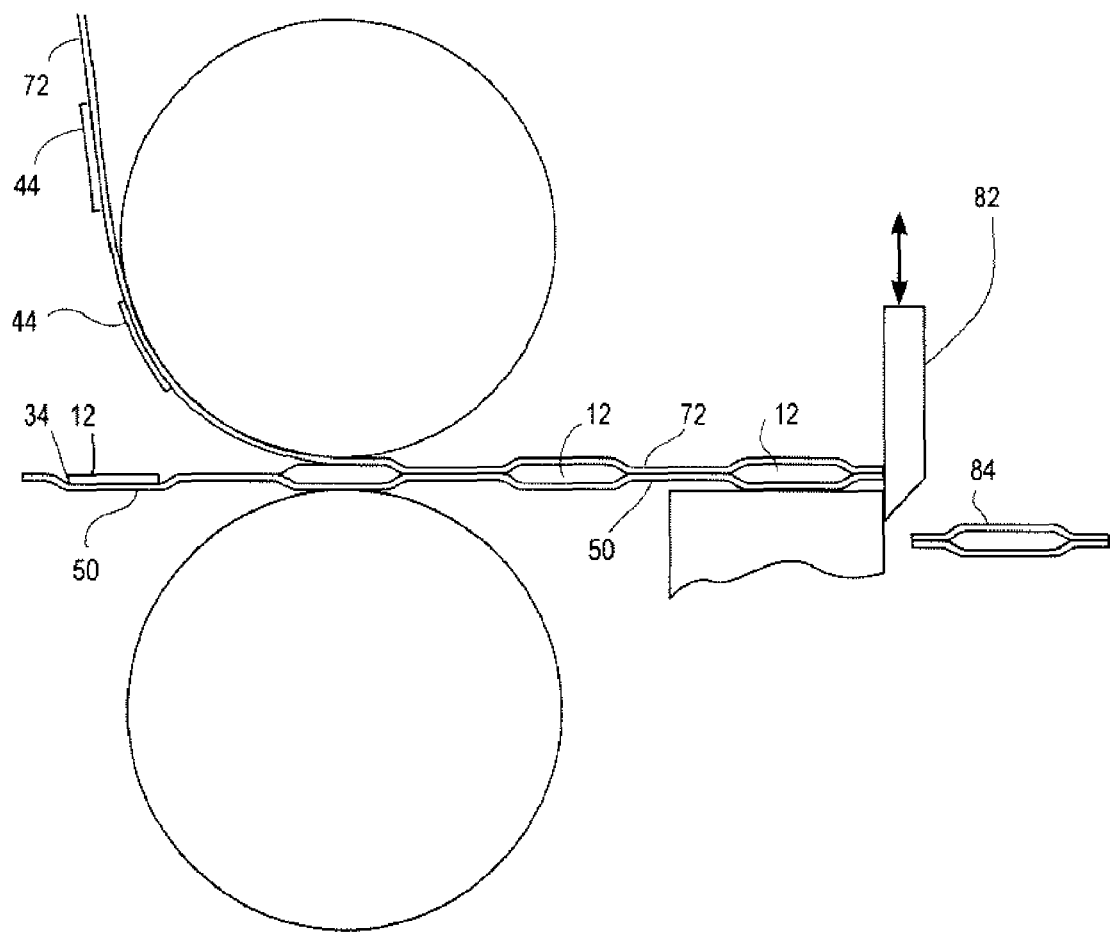
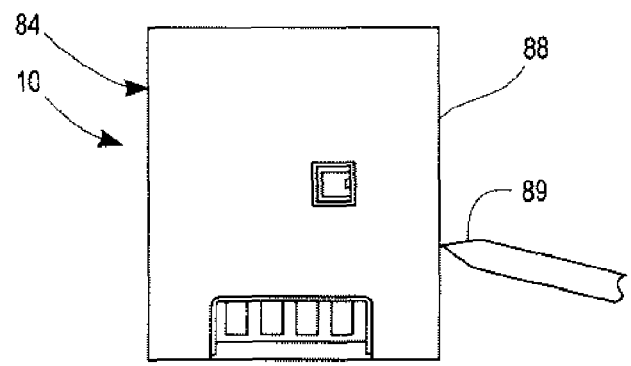

FAN RESISTOR

The present invention relates to a resistor for use with the fans of the heating and cooling device of a vehicle.

BACKGROUND OF THE INVENTION

The present invention relates to an improved fan resistor for use in vehicles where the fan is part of the equipment for heating or air conditioning the cabin of a vehicle and the resistor is in series with the fan for adjustably setting fan speed.

The fans that circulate cabin air around the heating and cooling devices are driven by DC current from the battery and fan speed is adjusted by the provision of an adjustable resistor in series with the fan. When the fan is operating at a very low rate, most of the power is being dissipated in the resistor and the heat generated in the resistor must be dissipated to prevent failure of the resistor. Existing fan resistors are formed on a nonconductive substrate such as ceramic and applied to one surface of the nonconductive substrate is a serpentine pattern of an electrically resistive material forming the electrically resistive path of the resistor. The substrate with the serpentine pattern thereon is encapsulated in a heat conductive enclosure for transferring away the heat generated therein. It is common for the enclosure to be in the form of a pair of parallel aluminum plates with the substrate having the pattern of resistive material sandwiched between the plates. The package, including the plates, substrate and resistive pattern, is positioned near the fan such that air circulated by the fan cools the heat conductive plates and dissipates heat generated in the resistive pattern.

The serpentine pattern of electrically resistive material is presently applied to the surface of a substrate using either a printing process in which a die having an etching therein shaped in the contour of the desired serpentine pattern is filled with an electrically resistive ink. A print pad is applied to the die thereby transferring the pattern to the print pad after which the print pad is applied to the substrate to print the pattern thereon. Alternately, the serpentine pattern can be formed by first painting a central portion of the substrate with an electrically resistive paint and then using a laser to burn off undesired portions of the paint leaving only the serpentine pattern.

Regardless of whether the serpentine pattern is formed using an ink and a printing process or formed using a paint and a laser, the process of making such a fan resistor is expensive. The chemicals, ink or paint, are expensive because they require rare and expensive noble metals in their manufacture. Also, the printing or laser burning process is time consuming.

SUMMARY OF THE INVENTION

Briefly, the present invention is an improved fan resistor, the manufacture of which is simplified and less expensive than for existing fan resistors. In its completed form, the resistive material of the fan resistor consists of a metal plate made of an alloy of copper and nickel, zinc or other partially conductive material, where the plate has first and second opposing surfaces and the plate is cut into the desired resistive pattern using a metal stamping process. The resistive pattern therefore has first and second opposing planar surfaces and joining the first and second surfaces are first and second spaced apart edges. the spaced apart edges are serpentine in shape and define the contour of the resistive pattern. The serpentine shape of the resistive plate also defines contact surfaces to which electric wires can be bonded or soldered. The plate with the serpentine pattern is in turn sandwiched between a pair of thermally conductive planar panels and between the serpentine resistive pattern and each of the panels is a film or coating of electrically insulating material that electrically insulates the resistive pattern from the thermally conductive panels.

To manufacture the fan resistor of the invention, a first panel of heat conducting material is provided. The heat conducting panel has opposing planar surfaces and an outer edge. An electrically insulating material is then applied to one surface of the first panel to form an insulating barrier thereon with the insulating barrier having an outer edge. Thereafter, a planar panel of electrically resistive material is provided along with a stamping machine. The planar panel of electrically resistive material is thereafter cut by the stamping machine into a serpentine resistive pattern. The serpentine resistive pattern has outer edges with dimensions that are less than the dimensions of the outer edges of the electrically insulating barrier. The resistive pattern is thereafter positioned on the surface of the electrically insulating barrier on the first heat conductive panel with the outer edges of the resistive pattern fitted within the edge of the electrically insulating barrier.

In one embodiment, a second panel of heat conductive material is also provided having planar opposing surfaces and an outer edge, and a barrier of electrically insulting material is applied to one surface of the second panel. The barrier on the second panel has an exposed surface and an outer edge having dimensions that are larger than the outer dimensions of the resistive pattern. The second panel of heat conductive material is thereafter positioned with the second insulating barrier thereon against the second surface of the planar resistive pattern thereby forming a sandwich configuration with the serpentine resistive pattern in the center. Each of the surfaces of the resistive pattern is also separated from the adjacent heat conductive panel by an electrically insulating barrier.

BRIEF DESCRIPTION OF THE DRAWINGS

A better understanding of the invention will be had after a reading of the following detailed description taken in conjunction with the drawings wherein:

FIG. 7 is a side view of an assembly machine for assembling a second thermally conductive strip having a barrier of electrically insulating material thereon against the upper surface of the resistive pattern on the first thermally conductive strip and a cutting machine for cutting the aligned strips into individual panels; and FIG. 8 is a top elevational view of a single resistor having the edges thereof welded together by a welding machine to thereby encapsulate the conductive material therein.

DETAILED DESCRIPTION OF PREFERRED EMBODIMENT

Figure 1:
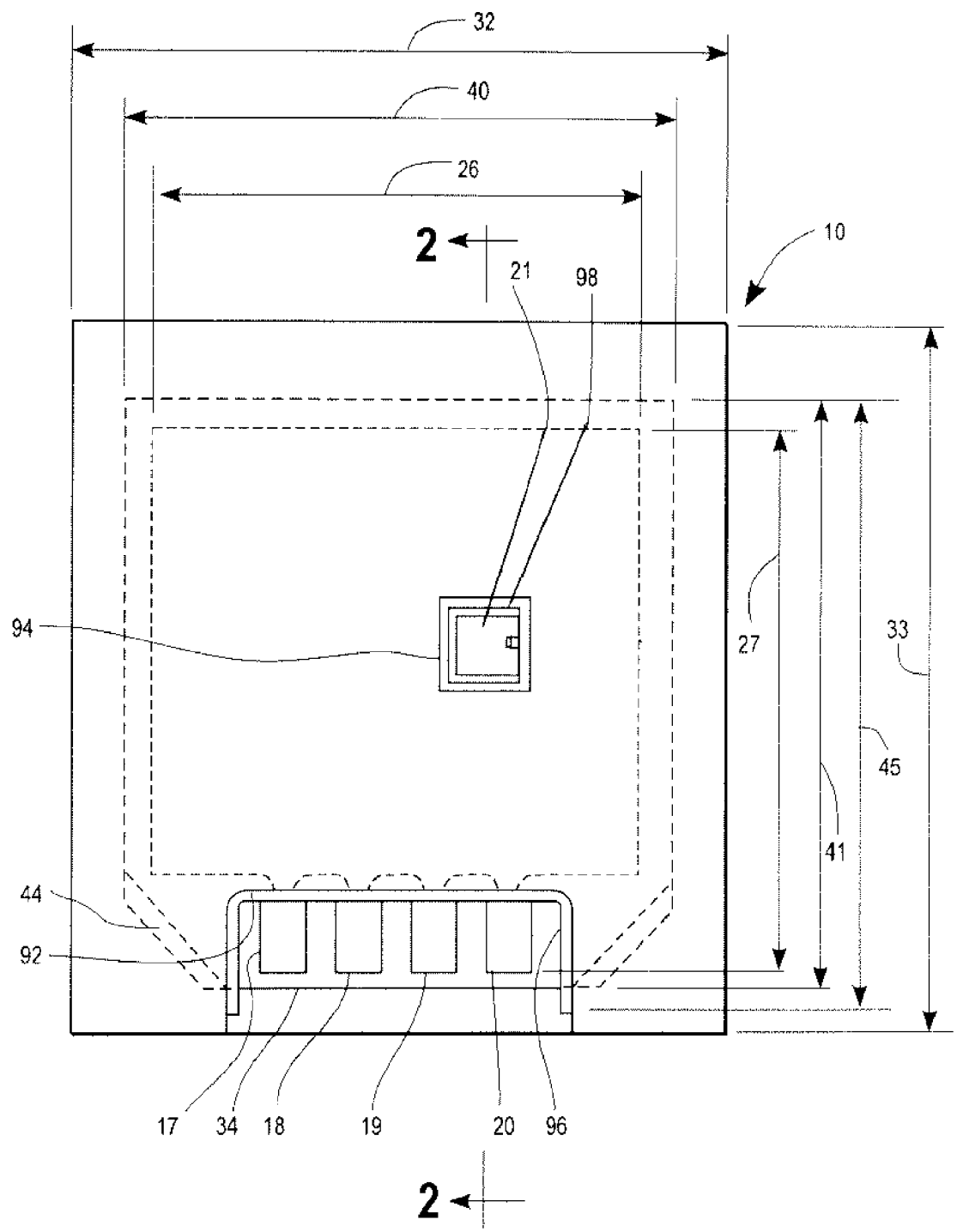
FIG. 1 is a front elevational view of a fan resistor in accordance with the present invention.
Figure 2:
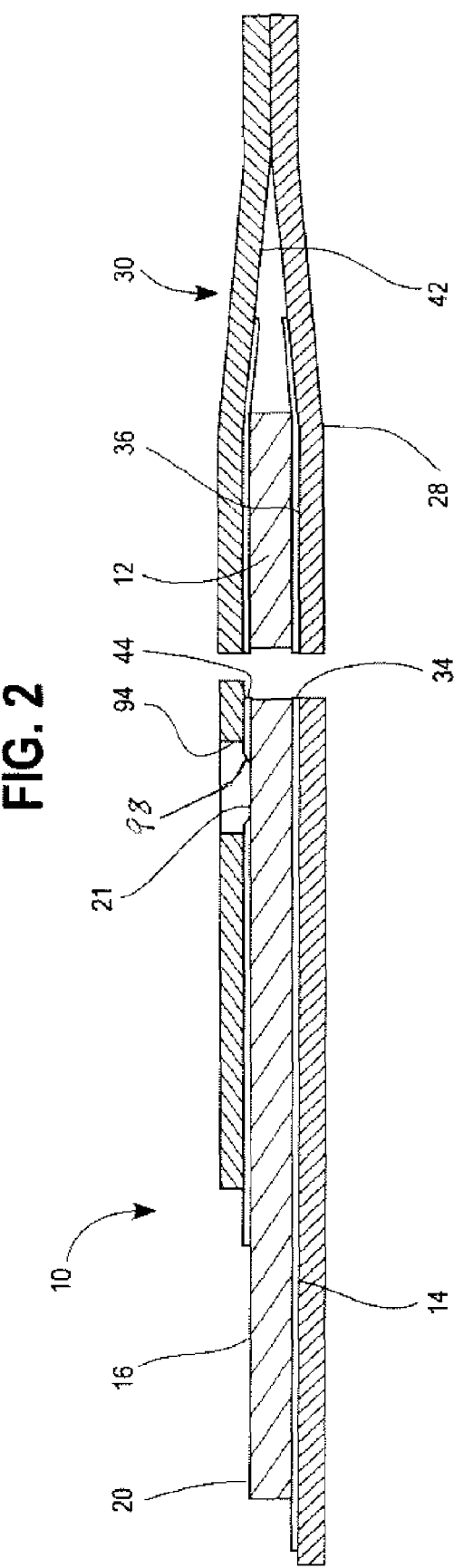
FIG. 2 is a greatly enlarged fragmentary cross-sectional view of the fan resistor shown in FIG. 1 taken through line 2-2 thereof.
Figure 3:
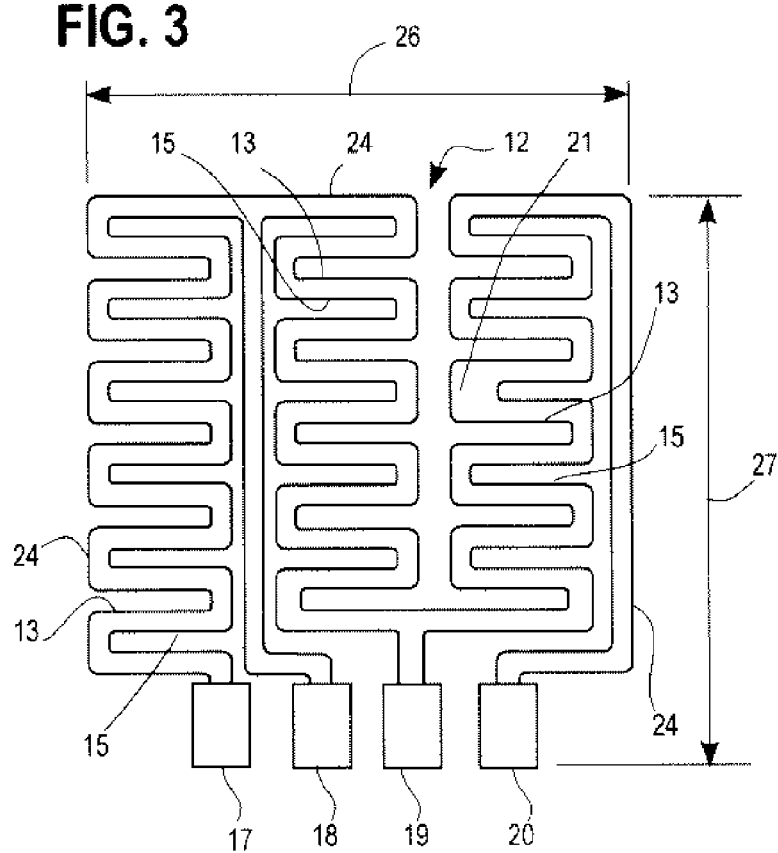
FIG. 3 is a front elevational view of a resistive pattern useable in the fan resistor shown in FIG. 1.

Referring to FIGS. 1, 2 and 3, the heart of a fan resistor 10 in accordance with the present invention is a planar panel of a partially electrically conductive material that is cut in a stamping operation, as hereinafter further described, into a serpentine resistive pattern 12 as depicted in FIG. 3. The resistive pattern 12 has first and second opposing surfaces 14, 16 and spaced apart, generally complementary, side edges 13, 15 that define the serpentine design of resistive pattern 12. Positioned at certain points within the serpentine design are a plurality of contact pads 17, 18, 19, 20, 21 which serve as terminals for electrically connecting to a wire or the like for connecting the resistor into a fan circuit, not shown.

Portions of the side edges 13, 15 of the resistive pattern define an outermost edge 24 that may have any contour but is depicted herein as defining a generally rectangular outer shape, the shape having outer dimensions 26, 27. The resistive pattern 12 is positioned between a pair of thermally conductive planar panels 28, 30 each of which has outer dimensions 32, 33 that are larger than the corresponding outer dimensions 26, 27 of the resistive pattern 12. Between one surface 14 of the resistive pattern 12 and the adjacent surface 36 of thermally conductive panel 28 is a barrier 34 of electrically insulating material which may be in the form of a flexible film such as a polymide cut to the desired size and positioned between the parts or may be in the form of a insulating coating painted on or otherwise applied to the surface 36 of the thermally conductive panel 28. The insulating barrier 34 may also be in the form of an anodized surface of the thermally conductive panel 28. The electrically insulating barrier 34 has an outer edge having dimensions 40, 41 that are less than or equal to the outer dimensions 32, 33 of the thermally conductive panel 28 and greater than the outer dimensions 26, 27 of the resistive pattern 12. The resistive pattern 12 is positioned over the insulating barrier 34 such that the insulating barrier 34 separates the entire surface 14 of the resistive pattern 12 from the surface 36 of the thermally conductive panel 28.

In similar fashion, separating the second surface 16 of the resistive pattern 12 from one surface 42 of the second thermally conductive panel 30 is a second barrier 44 of electrically insulating material which may also be in the form of either a film or a coating as described with respect to the first insulating barrier 34. The electrically insulating barrier 44 also has outer dimensions 40, 45 that are less than or equal to the outer dimensions 32, 33 of the thermally conductive panel 30 and greater than the outer dimension 26, 27 of the resistive pattern 12. The second thermally conductive panel 30 and the electrically insulating material 44 are positioned with respect to the second surface 16 of the resistive pattern 12 such that the entire surface 16 is spaced by the insulating barrier 44 from the surface 42 of the second panel of thermally conductive material 30.

Figure 4:
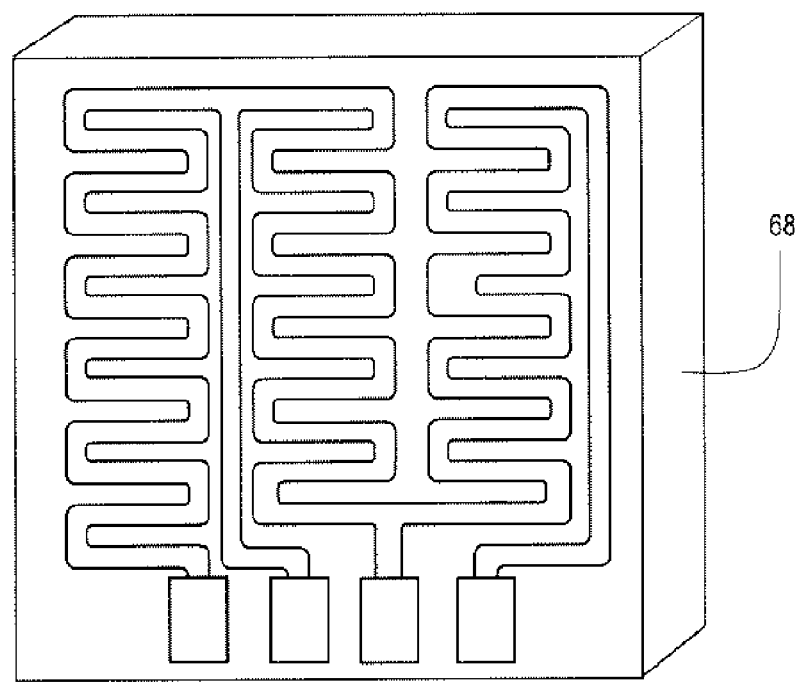
FIG. 4 is an isometric view of a die suitable for stamping a resistance pattern, as shown in FIG. 3, from a sheet of metal.
Figure 5:
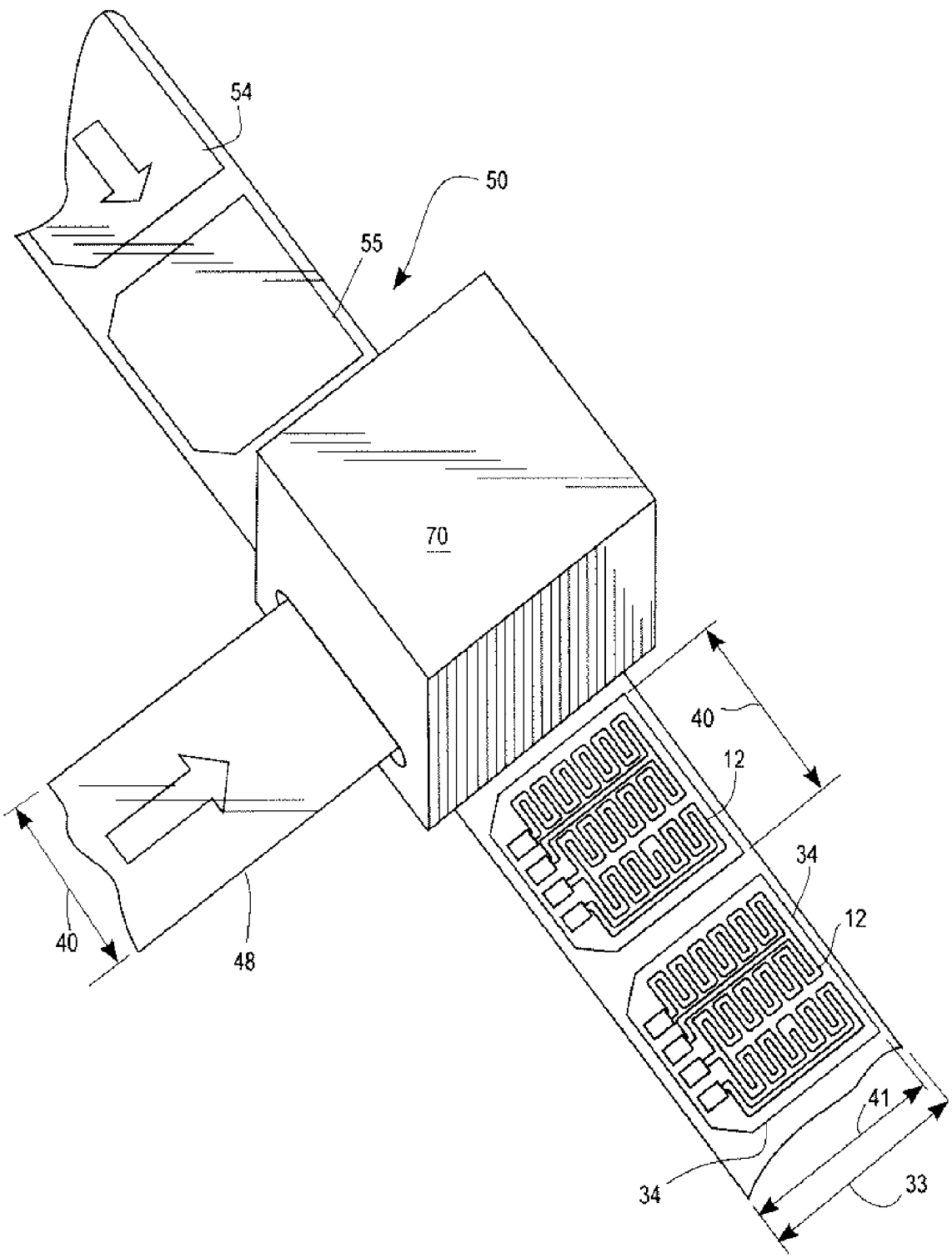
FIG. 5 is a schematic drawing of a stamping machine stamping resistance patterns as shown in FIG. 4 from a thin metal plate and depositing them on a first strip of thermoconductive material having a repeating pattern of an electrically insulating film thereon.
Figure 6:
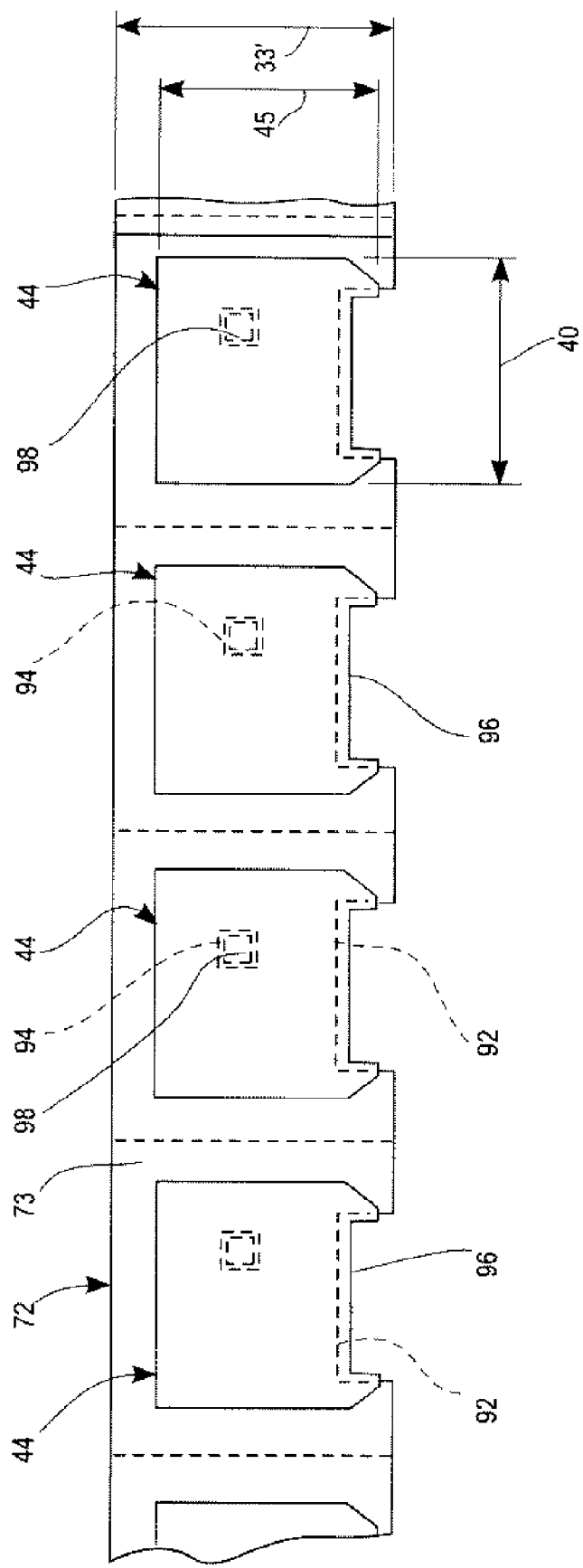
FIG. 6 is a bottom elevational view of a second strip of thermally conductive material having a repeating pattern of an electrically insulating film on the lower surface thereof.

Referring to FIGS. 3, 4 and 5, in the preferred embodiment, the serpentine resistive pattern 12 is cut from a thin metal sheet 48, the thickness of which may be approximately four milli-inches or 0.0004 inches and the width 40' of which is equal to one outer dimension 40 of a resistive pattern 12. The plate 48 may be made of an alloy of copper and another metal such as nickel or zinc, all of which are abundant and relatively inexpensive. The thermally conductive panels 28, 30 are made of any suitable material such as aluminum and the two panels may be substantially identically shaped such that the edges can be readily bonded together by any suitable means such as a weld. Alternately, one panel 28, 30 may be a little larger than the other panel with the outer ends of the larger panel folded over the edges of the smaller panel and crimped into engagement whereto to hold the two panels 28, 30 together.

Referring to FIG. 5, to manufacture the resistor 10, a first elongate strip 50 of thermally conductive material, such as aluminum, having a width 33' equal to one of the outer dimensions 33 of completed fan resistor 10 is provided. Positioned along the upper surface 52 of the strip 50 are spaced apart patches of electrically insulating material, each of which will become an insulating barrier 34 in a completed fan resistor 10. The insulating barriers 34 may be in the form of thin flexible material of a roll, the surfaces of which have an adhesive coating thereon with the adhesive surfaces protected by a removable covering. After removal of the covering, the surface of the insulating material will adhere to the upper surface 52 of the strip 50. A cutting blade cuts the strip of insulating material into the desired lengths for one dimension of the barrier 34. The cut length of insulating material 61 is dropped on to the upper surface of a section of the thermally conductive strip 50 to form a patch of insulating barrier 34. After receiving an insulating barrier 34, the strip 50 is advanced the width 32 of one fan resistor 10 after which another insulating barrier 34 is deposited on a new section of the thermally conductive strip 50.

Referring to FIGS. 3, 4 and 5, the metal panel 48 is in the form of an elongate strip that is incrementally moved beneath a cutting die 68 within a stamping machine 70. With each stamp of the machine 70, a serpentine resistive pattern 12 that includes the contact pads 17-21 is cut from the panel 48 with each resistive pattern 12 having the resistive qualities required for a fan resistor 10. Each stamped resistive pattern 12 is dropped with the lower surface 16 thereof falling upon the upper surface of one of the insulating barriers 34 on the strip 50. The outer dimensions 26, 27 of each resistive pattern 12 are less than the corresponding outer dimensions 40, 41 of one of the electrically insulating barriers 34 and the outer edge 24 of each resistive pattern 12 is positioned to fit within the outer edge of the underlying insulating barrier 34 thereby electrically insulating the resistive pattern 12 from the thermally conductive material of the strip 50.

As shown in FIGS. 1, 2, 6, and 7, simultaneously with the assembly of the resistive patterns 12 on the surface of the strip 50, a second strip 72 of thermally conductive material, such as aluminum, is provided. The second strip 72 has a surface 73, and the width 33' of strip 72 is identical to the width 33 of the first strip 50. The surface 73 thereof is provided with a second plurality of spaced apart insulating barriers 44 having outer dimensions 40, 45 that are nearly identical to the insulating barriers 34 on the first strip 50. Each of the insulating barriers 44 on the surface 73 of the second strip 72 is positioned by a machine 74 above the upper surfaces 14 of one of the resistive patterns 12. It should be appreciated that the insulating barriers 44 on the second metal strip 72 are positioned to align directly opposite the insulating barriers 34 of the first strip 50 such that the outer edges of each of the insulating barriers 44 on the second strip 72 extend beyond the outer edge 26, 27 of the resistive pattern 12 against which it is positioned, thereby electrically insulating each of the resistive patterns 12 from the second thermally conductive strip 72.

Referring further to FIGS. 1, 2, 6, and 7, strip 72 has a repeating pattern of cutout portions 92, and holes 94 therein and the strip 72 is aligned with the strip 50 such that the surface 73 of the second strip 72 is applied against the surface 14 of the resistive pattern 12 with the conductive pads 17, 18, 19, and 20 uncovered by the cutout portion 92. To insulate the resistive pattern 12 from the strip 72, the insulating barriers 44 also have a repeating pattern of indentations 96 and repeating pattern of holes 98. Strip 72 is aligned with respect to the strip 50 to position the indentations 96 of the barriers 44 around the contacts 17, 18, 19 and 20 thereby leaving them uncovered and position the holes 98 to leave the contacts 21 uncovered. Also, the cutout portion 92 in strip 72 defines an uncovered area that is larger than the uncovered area defined by the indentations 96 in the barrier 44 such that a portion of insulating barrier 44 separates the resistive pattern 12 from the strip 72 along the edges of the cutouts 92. In similar fashion, the holes 94 are smaller in diameter than the holes 98 such that a portion of the insulating barrier 44 extends around the edges of each of the cutouts 94 thereby insulating the edge of the holes 98 in the strip 72 from the resistive pattern 12.

As shown in FIGS. 7 and 8, the combined strips 50, 72 are thereafter cut by a cutting machine 82 into separate rectangular panels 84 with the cuts equally dividing the spaces between adjacent insulating barriers 34 and 44. The elements of the panels are temporarily retained together by the adhesive on the insulating barriers 34, 44. The edges 88, 90 of the panels 84 are bonded together by any suitable means such as by a weld 89 formed by a welding machine 90 to form each of the resistors 10.

In the completed form, the cut sections of the first and second strips 50, 72 become the thermally conductive panels 28, 30 of the resistor 10 and the insulating barrier 34, 44 insulates the resistive pattern 12 from the first and second thermally conductive panels 28, 30.

While the present invention has been described with respect to a single embodiment, it will be appreciated that many modifications and variations can be made without departing from the spirit and scope of the invention. It is therefore the intent of the appended claims to cover all such modifications and variations that fall within the spirit and scope of the invention.

What is claimed:

1. A resistor comprising
a unitary planar panel of resistive metal shaped into a serpentine resistive pattern having a first and a second opposing planar surface and a pair of spaced apart serpentine edges defining said resistive pattern,
said unitary panel having a plurality of contact surfaces for connecting said resistive pattern into an electric circuit,
a panel of heat conductive material,
an electrically insulating barrier having a first planar surface applied against said first surface of said unitary panel and a second surface against which a surface of said panel of heat conductive material is applied,
said insulating barrier covering all of said first surface except for said plurality of contact surfaces, and said panel of heat conductive material covering said insulating barrier and leaving said contact surface uncovered.

2. The resistor of claim 1 and further comprising a second panel of heat conductive material,
a second electrically insulating barrier having a first planar surface applied against said second surface of said unitary panel and a second surface against which a surface of said second panel of heat conductive material is applied, wherein said unitary panel is sandwiched between said panel of heat conductive material and said second panel.

3. The fan resistor of claim 2 wherein an outer edge of said panel of heat conductive material is welded to an outer edge of said second panel.

4. The resistor of claim 2 wherein said unitary panel is made of an alloy of copper and another metal.

5. The resistor of claim 4 wherein said other metal is one of zinc and nickel.

6. The resistor of claim 1 wherein said heat conductive material is aluminum.

7. The resistor of claim 2 wherein said second panel covers all of said second surface including said contact surfaces.

8. A resistor comprising
a unitary metal plate defining a serpentine resistive pattern, said metal plate having a first and a second opposing planar surface and spaced apart serpentine edges defining said resistive pattern,
said unitary metal plate including a plurality of contact surfaces for connecting said resistive pattern into an electric circuit,
a first electrically insulating barrier on said first surface of said metal plate,
said first insulating barrier covering all of said first surface except for said plurality of contact surfaces,
a first panel of heat conductive material having outer dimensions that are greater than outer dimensions of said unitary metal plate,
said first panel having at least one cutout portion,
said first panel covering said insulating material on said first surface with said at least one cutout portion leaving said plurality of contacts uncovered,
a second electrically insulating barrier on said second surface of said metal plate,
said second insulating barrier covering all of said second surface,
a second panel of heat conductive material having outer dimensions that are greater than outer dimensions of said unitary metal plate,
said second panel without a cutout portion to leave said contacts uncovered wherein said first surfaces of said contacts are exposed and said second surfaces of said contacts are covered.

9. The resistor of claim 8 wherein said first and said second panels are made of aluminum.

* * * * *